(12) United States Patent
Raza et al.

(10) Patent No.: US 12,391,808 B1
(45) Date of Patent: Aug. 19, 2025

(54) LIGNIN EXTRACTION FROM LIGNOCELLULOSIC BIOMASS USING FRUIT-BASED NATURAL SOLVENT

(71) Applicant: United Arab Emirates University, Al Ain (AE)

(72) Inventors: Mohsin Raza, Al Ain (AE); Basim Abu-Jdayil, Al Ain (AE); Arafat Husain, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 19/178,120

(22) Filed: Apr. 14, 2025

(51) Int. Cl.
C08H 7/00 (2011.01)

(52) U.S. Cl.
CPC .................. C08H 6/00 (2013.01)

(58) Field of Classification Search
CPC .......................................... C08H 6/00
USPC ..................................... 530/502
See application file for complete search history.

(56) References Cited

U.S. PATENT DOCUMENTS

2024/0158637 A1    5/2024   Alban

FOREIGN PATENT DOCUMENTS

WO    WO-2021087303 A1 *  5/2021  ......... B29C 48/022

OTHER PUBLICATIONS

Alfaleh, Alanood A., and Heba A. Sindi. "Systematic Study on Date Palm Seeds (Phoenix dactylifera L.) Extraction Optimisation Using Natural Deep Eutectic Solvents and Ultrasound Technique." Scientific Reports, vol. 14, No. 1, Jul. 2024, p. 16622. DOI.org (Crossref), https://doi.org/10.1038/s41598-024-67416-9.

(Continued)

Primary Examiner — David T Karst
(74) Attorney, Agent, or Firm — Boyle Fredrickson, S.C.

(57) ABSTRACT

A method for extracting lignin from lignocellulosic biomass using a non-choline chloride based natural deep eutectic solvent (NADES) formed from Citric Acid (CA) and Fructose (Fr) comprises mixing the biomass with the NADES, obtaining a lignin-NADES suspension, lyophilizing, rehydrating, and drying the suspension, and repeating the rehydration and drying steps to obtain lignin particles. The biomass used can be Ghaf biomass waste. The NADES preparation includes adding distilled water to reduce viscosity, mixing CA and Fr with distilled water in specific molar ratios of CA:Fr:distilled water of: 1:1:1, or 3:1:1, or 5:1:1, adjusting pH, stirring, and heating. The method also includes specific conditions for mixing, stirring, heating, and terminating the reaction. The lignin-NADES suspension is obtained through vacuum filtering and lyophilized by vacuum freeze-drying. The method avoids the use of acid-precipitation techniques, ensuring an efficient and environmentally friendly lignin extraction process.

19 Claims, 8 Drawing Sheets

(56) References Cited

OTHER PUBLICATIONS

Meraj, Aatikah, et al. "Isolation and Characterisation of Lignin Using Natural Deep Eutectic Solvents Pretreated Kenaf Fibre Biomass." Scientific Reports, vol. 14, No. 1, Apr. 2024, p. 8672. DOI.org (Crossref), https://doi.org/10.1038/s41598-024-59200-6.
Soto-Salcido, L. A., et al. "NADES-Based Fractionation of Biomass to Produce Raw Material for the Preparation of Cellulose Acetates." Cellulose, vol. 27, No. 12, Aug. 2020, pp. 6831-6848. DOI.org (Crossref), https://doi.org/10.1007/s10570-020-03251-1.
Liu, Zhao, et al. "Extraction of Lignin from Pulping Black Liquor by Organic Acid." Materials Science Forum, vol. 620-622, Apr. 2009, pp. 571-574. DOI.org (Crossref), https://doi.org/10.4028/www.scientific.net/MSF.620-622.571.

\* cited by examiner

Table 1: Composition and pH of NADES

| NADES | Molar ratio | pH |
|---|---|---|
| CA/Fr/DI | 1:1:1 | 1.70 |
| CA/Fr/DI | 3:1:1 | 1.54 |
| CA/Fr/DI | 5:1:1 | 1.40 |

Fig. 7

Table 2: Elemental composition of Raw Ghaf waste and Extracted Lignin

| Elements | Mass% | | Atom% | |
|---|---|---|---|---|
| | Raw Ghaf | Extracted Lignin | Raw Ghaf | Extracted Lignin |
| C | 61.13 | 70.26 | 67.82 | 75.89 |
| O | 38.28 | 29.74 | 31.88 | 24.11 |

Fig. 8

Table 3: X-ray diffraction analysis of Raw Ghaf Waste and Extracted Lignin

| Sample | Amorphous | | Crystalline | | $C_{rl}$ (%) |
|---|---|---|---|---|---|
| | $2\theta$ | $I_{am}$ | $2\theta$ | $I_{200}$ | |
| Raw Ghaf | 18.6 | 562.79 | 22.6 | 961.37 | 41.46 |
| Extracted lignin | 18.6 | 663.42 | 22.8 | 741.76 | 10.56 |

Fig. 9

Table 4: Thermal characteristic properties of Raw Ghaf Waste and Extracted Lignin

| Material | $T_{onset}$ (°C) | $Mass_{loss}$ (%) at $T_{onset}$ | Devolatilization range (°C) | $Mass_{loss}$ (%) in the Devolatilization range | Char (%) |
|---|---|---|---|---|---|
| Raw Ghaf | 238 | 8.72 | 238-364 | 54.06 | 20.85 |
| Extracted Lignin | 202 | 7.01 | 202-362 | 30.77 | 36.92 |

Fig. 10.

LIGNIN EXTRACTION FROM LIGNOCELLULOSIC BIOMASS USING FRUIT-BASED NATURAL SOLVENT

FIELD OF INVENTION

The invention relates to a method of extracting the lignin from a lignocellulosic biomass.

More specifically, the invention relates to a method of extracting the lignin from a lignocellulose biomass using a 100% organic fruit-based solvent.

BACKGROUND TO INVENTION

Lignocellulosic biomass is an economical, renewable, and sustainable resource with vast potential for bioenergy production and the development of biomaterials/and the extraction of useful biopolymers. It consists primarily of three essential biopolymers: lignin (20-25%), cellulose (45-50%), and hemicellulose (20-25%).

Lignin, which acts as the "glue" binding cellulose and hemicellulose, is water-insoluble and highly stable. As the second most abundant polymer after cellulose, approximately $3 \times 10^{11}$ metric tons of lignin exist globally, with an annual biosynthesis of around $2 \times 10^{11}$ metric tons. Due to its rich aromatic structure, lignin is widely used in the production of biofuels, bioplastics, and carbon fibers, while also serving as a sustainable alternative to petroleum-based chemicals in adhesives, coatings, and polymer composites.

The lignocellulose structural matrix is a complex network, where cellulose is encapsulated by a hemicellulose monolayer and embedded within a core matrix of lignin and hemicellulose, making component separation challenging.

Conventional fractionation processes rely on toxic chemicals like sodium hydroxide, sodium chlorite, and sodium hypochlorite, used in high concentrations (8-10%) at elevated temperatures (80-100° C.). While effective, the effluent/discharge from these pretreatment methods require post-processing before dispose to mitigate environmental damage, posing significant sustainability concerns. The use of green solvents for fractionating lignocellulosic biomass holds significant promise as a sustainable and environmentally friendly alternative to conventional chemical methods.

Natural deep eutectic solvents (NADES) are regarded as the solvent of the 21st century due to their biodegradability, eco-friendly and cost-effective nature. Composed of two or more inexpensive, renewable, and biodegradable components, they serve as a sustainable alternative to conventional solvents, effectively fractionating biomass into lignin and cellulose streams. NADES are typically made by combining choline chloride with organic acids like formic, acetic, or citric acid, and are easy to produce and low in toxicity. One of the most important advantages is the recovery of DES after the pretreatment process.

Chen et al. conducted a review and found that over 30 studies on lignin extraction from lignocellulosic biomass involved the use of choline chloride-based NADES. See Z. Chen, A. Ragauskas, and C. Wan, "Lignin extraction and upgrading using deep eutectic solvents," Industrial Crops and Products, vol. 147, p. 112241, 2020.

Similarly, Xiao et al. in their review on lignocellulose fractionation using NADES, also reported the dominance of choline chloride-based NADES for lignin dissolution. See T. Xiao et al., "Recent progress in deep eutectic solvent (DES) fractionation of lignocellulosic components: A review," Renewable and Sustainable Energy Reviews, vol. 192, p. 114243, 2024.

Despite choline chloride being widely used in making NADES for its advantageous properties, it is a synthetic compound formed by combining choline (a natural nutrient) with hydrochloric acid. Hydrochloric is a mineral acid with hindering it potential as fully non-toxic material. Thus, it is biodegradable and low in toxicity but is not considered fully organic due to its chemical synthesis.

Lignin precipitation is another important step in isolating lignin after it has been dissolved into NADES from lignocellulosic biomass. The common practice involves lowering the pH, typically by adding an acid such as sulfuric acid or an organic acid, which causes the lignin to solidify/precipitate and separate.

In a study by Meraj et al, lignin was extracted from NADES-pretreated kenaf fiber biomass. See A. Meraj et al., "Isolation and characterization of lignin using natural deep eutectic solvents pretreated kenaf fiber biomass," Scientific Reports, vol. 14, no. 1, p. 8672, 2024. The NADES was prepared using choline chloride and lactic acid in a 1:2 molar ratio. Lignin precipitation was achieved using 72% sulfuric acid solution. Sulfuric acid precipitation of lignin has several disadvantages, including its environmental impact due to the generation of sulfate-containing waste, which requires careful disposal to avoid pollution. In the study by Sharma et al, acetic acid and lactic acid were used as precipitation solvents for lignin from kraft black liquor. See M. Sharma, J. Marques, A. Simões, M. M. Donato, O. Cardoso, and L. M. Gando-Ferreira, "Optimization of lignin precipitation from black liquor using organic acids and its valorization by preparing lignin nanoparticles," International Journal of Biological Macromolecules, vol. 269, p. 131881, 2024. The substitution was motivated by concerns regarding environmental and process safety associated with sulfuric acid.

A need exists for a more environmentally friendly process for lignin extraction. More specifically, a need exists for fully organic NADES for lignin extraction. A need further exists for an acid-free method of obtaining lignin.

SUMMARY OF INVENTION

According to the first aspect of the invention there is provided a method of extracting lignin from a lignocellulosic biomass, the method comprising:
  providing a lignocellulosic biomass;
  providing a natural deep eutectic solvent (NADES) formed from Citric Acid (CA) and Fructose (Fr);
  mixing the lignocellulosic biomass with the natural deep eutectic solvent;
  obtaining a lignin-NADES suspension;
  lyophilizing the lignin-NADES suspension;
  rehydrating the lignin-NADES suspension;
  drying the rehydrated lignin-NADES suspension;
  repeating the step of rehydrating the lignin-NADES suspension and the step if drying the rehydrating the lignin-NADES suspension;
  thereby obtaining lignin particles.

As such, the NADES provided may be non-choline based. More specifically, the NADES provided may be organic and fruit based. The lignocellulosic biomass may be any lignocellulose biomass. More specifically, the lignocellulosic biomass may be Ghaf biomass waste.

The step of providing a natural deep eutectic solvent (NADES) formed from Citric Acid (CA) and Fructose (Fr) may comprise adding distilled water (DI) to the mixture to reduce viscosity, allowing DI to become part of the NADES superstructure.

The step of providing a natural deep eutectic solvent (NADES) formed from Citric Acid (CA) and Fructose (Fr) may comprise mixing CA and Fr with distilled water (DI) in a fixed molar ratio to form the NADES, wherein the fixed molar ratio of CA to Fr to distilled water is selected from the group consisting of: 1:1:1, 3:1:1, and 5:1:1.

The step of providing a natural deep eutectic solvent (NADES) formed from Citric Acid (CA) and Fructose (Fr) may include adjusting a pH to about pH 1.4.

The step of providing a natural deep eutectic solvent (NADES) formed from Citric Acid (CA) and Fructose (Fr) may comprise stirring the mixture to ensure proper mixing. The mixture may be stirred at about 600 rpm. More specifically, the mixture may be stirred at 600 rpm for 10 minutes. The mixture may be stirred in a flask.

The step of providing a natural deep eutectic solvent (NADES) formed from Citric Acid (CA) and Fructose (Fr) may comprise heating the mixture to approximately 100° C. to evaporate the DI. The heating may result in a yellowish NADES.

The step of providing a natural deep eutectic solvent (NADES) formed from Citric Acid (CA) and Fructose (Fr) may comprise adding a fixed volume/volume ratio of dilution water to the viscous NADES to lower its viscosity.

The natural deep eutectic solvent (NADES) formed from Citric Acid (CA) and Fructose (Fr) may be organic. The natural deep eutectic solvent (NADES) formed from Citric Acid (CA) and Fructose (Fr) may be fruit-based/fruit derived.

The step of mixing the lignocellulosic biomass with the natural deep eutectic solvent may comprise treating the Ghaf biomass waste with NADES at a biomass-to-solvent ratio (w/v) of about 1:10.

The step of mixing the lignocellulosic biomass with the natural deep eutectic solvent may comprise stirring the mixture. More specifically, the mixture may be stirred at about 500 rpm. The stirring may be accompanied by heating the mixture at 60° C. The mixture may be heated for about 3 hours.

The step of mixing the lignocellulosic biomass with the natural deep eutectic solvent may comprise terminating the reaction by adding cold water. More specifically about 20 mL of cold water (about 4° C.).

The step of obtaining a lignin-NADES suspension may comprise vacuum filtering the mixture to obtain the lignin-NADES suspension as filtrate.

The step of lyophilizing the lignin-NADES suspension may comprise vacuum freeze-drying the lignin-NADES suspension. The lignin-NADES suspension may be vacuum freeze-dried at about −85° C. The vacuum freeze-drying may continue for about 24 hours.

The step of rehydrating the lignin-NADES suspension may comprise mixing a mixture obtained from the lyophilizing step with about 20 mL of fresh deionized water (DI).

The inventors have advantageously found that dissolving the lignin along with residual NADES in water disrupts the eutectic structure, effectively lowering the NADES boiling point.

The step of drying the rehydrated lignin-NADES suspension may comprise drying the mixture obtained from the lyophilizing step in an air-circulating oven at about 105° C. for about 24 hours.

The step of drying the rehydrated lignin-NADES suspension may comprise stirring the material produced in the rehydrating step with DDI. More specifically, stirring the material produced in the rehydration step may comprise stirring with about 20 ml of DI for about 5 minutes and repeating the drying process three times until fully dry, dispersible lignin particles are obtained.

The inventors have advantageously found that repeated evaporation with fresh DI after lyophilization promotes co-evaporation, where water vapor carries away residual NADES components during drying at about 105° C.

The inventors have further found that repeated washing and drying cycles ensure complete removal, resulting in pure, dispersible lignin particles.

The inventors have advantageously found that the method of extracting lignin from a lignocellulosic biomass is thus achieved without use of acid-precipitation methods.

BRIEF DESCRIPTION OF DRAWINGS

Further features of the invention are described hereinafter by way of a non-limiting example of the invention, with reference to and as illustrated in the accompanying schematic drawings. In the drawings:

FIG. 2 (b) shows a SEM Image of Raw Ghaf Waste at 50 μm;

FIG. 2 (c) shows a SEM Image of Extracted Lignin at 20 μm;

FIG. 2 (d) shows a SEM Image of Extracted Lignin at 50 μm;

FIG. 3 (b) shows the EDX analysis of extracted lignin, highlighting the changes in elemental composition;

FIG. 7 shows Table 1 showing the composition and pH of NADES in accordance with the invention;

FIG. 8 shows Table 2 showing the elemental composition of Raw Ghaf waste and Extracted Lignin extracted in accordance with the method of the invention;

FIG. 9 shows Table 3 showing X-ray diffraction analysis of Raw Ghaf Waste and Extracted Lignin, extracted in accordance with the method of the invention.

FIG. 10 shows Table 4 showing thermal characteristic properties of Raw Ghaf Waste and Extracted Lignin, extracted in accordance with the method of the invention.

DETAILED DESCRIPTION OF THE DRAWINGS

To date, lignin (a natural biopolymer) extraction has been carried out from lignocellulosic biomass resources using alkaline solutions such as NaOH, KOH, and chlorinated solutions such as $NaClO$ and $NaClO_2$. In the last decade, much effort has been put into extracting lignin from lignocellulosic biomass wastes using deep eutectic solvents primarily composed of choline chloride. Choline chloride is a synthetic compound formed by combining choline (a natural nutrient) with hydrochloric acid, so it is biodegradable and low in toxicity but is not considered fully organic due to its chemical synthesis.

Figure 1:
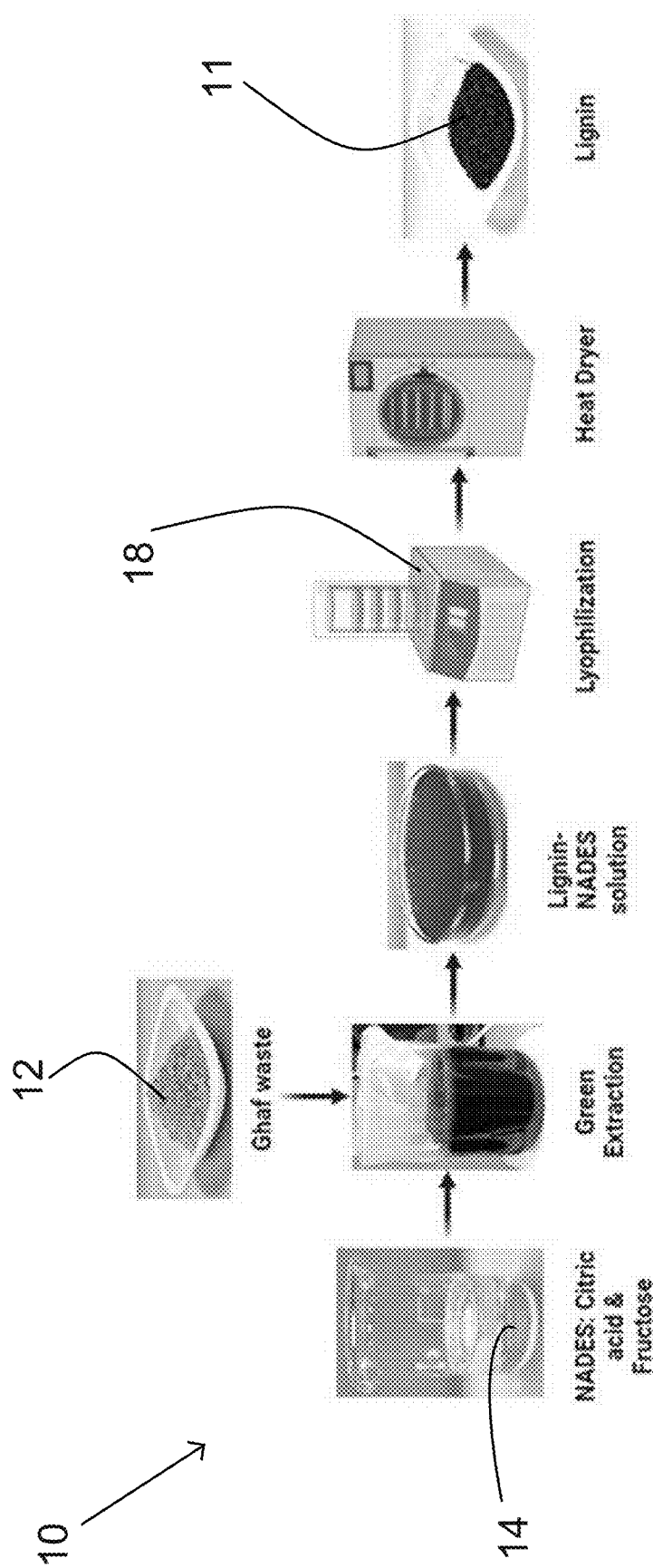
FIG. 1 shows an overview of the complete lignin extraction method, in accordance with the invention.

With reference to FIG. 1 of the drawings, a method of extracting lignin 11 from a lignocellulosic biomass using organic fruit-based solvent is indicated generally by the reference numeral 10.

More specifically, the method 10 of the present invention describes a procedure where lignin 11 is extracted from lignocellulosic biomass (Ghaf biomass waste) 12 using a 100% organic fruit-based solvent, in the form of organic natural deep eutectic solvent (NADES) 14, combined with an acid-free protocol to obtain lignin 11, making the entire process environmentally safe.

The method 10 of the invention is described in detail hereinbelow and begins with preparation of an organic solvent.

Procedure for Preparation of Organic Solvent

Citric acid (CA) and fructose (Fr) were used to make an organic natural deep eutectic solvent (NADES) 14. The applicants believe that the NADES 14 in accordance with the present invention is completely, i.e., 100% organic, since it comprises only CA and Fr.

NADES 14 was prepared using the conventional heating and stirring method. CA and Fr were mixed in a fixed molar ratio, and distilled water (DI) was added to reduce the viscosity, becoming part of the NADES 14 superstructure. The mixture was stirred at 600 rpm for 10 minutes in a flask to ensure proper mixing. Once stirring was complete, the mixture was heated to 100° C. to evaporate the DI. After the water had completely evaporated, the resulting yellowish NADES 14 was obtained. To lower the viscosity, a fixed volume/volume ratio of dilution water was added to the viscous NADES 14 so that it could treat the biomass. The nomenclature for the NADES 14 mixtures is based on the fixed molar ratio of CA, Fr, and DI. The molar ratio of NADES based on CA, Fr, and DI as shown in FIG. 7 (Table 1).

Referring to Table 1 (see FIG. 7) the molar ratio and pH of NADES 14 are shown for three different components NADES consisted of CA, Fr and DI.

Procedure for Lignin 11 Extraction

FIG. 1 shows an overview of the complete extraction process described below.

Ghaf biomass waste 12 was obtained from the Ghaf tree (*Prosopis cineraria*), which is a species of tree native to arid and semi-arid regions of the Middle East, particularly the Arabian Peninsula.

The Ghaf biomass waste 12 was treated with NADES 14 (100% organic fruit-based solvent) at a biomass-to-solvent ratio (w/v) of 1:10. The mixture was stirred at 500 rpm, maintained at 60° C. for 3 hours, and the reaction was terminated by adding 20 mL of cold water (4° C.). The mixture was vacuum filtered to obtain lignin-NADES suspension 16 as filtrate. The lignin-NADES suspension 16 was vacuum freeze-dried (lyophilization) in a vacuum freeze-dryer 18 at −85° C. for 24 hours. The thick paste containing lignin and residual NADES 14 was then mixed with 20 mL of fresh deionized water (DI) and dried in an air-circulating oven 20 at about 105° C. for 24 hours. The lignin was further stirred with 20 mL of DI for 5 minutes, and the drying process was repeated three times until fully dry, dispersible lignin particles were obtained.

Since the NADES 14 components (fructose and citric acid) have boiling points higher than 105° C., they cannot evaporate directly at this temperature. However, dissolving the lignin along with residual NADES 14 in water disrupts the eutectic structure, effectively lowering the NADES 14 boiling point. This promotes co-evaporation, where water vapor carries away residual NADES 14 components during drying at 105° C. Repeated washing and drying cycles ensure complete removal, resulting in pure, dispersible lignin 11 particles.

Experimental Results

The experimental results show the success of extracting lignin from lignocellulosic biomass using NADES 14 which was composed of a 100% organic fruit-based solvent.

Scanning Electron Microscopy (SEM)

Figures 2A, 2B, 2C, 2D:
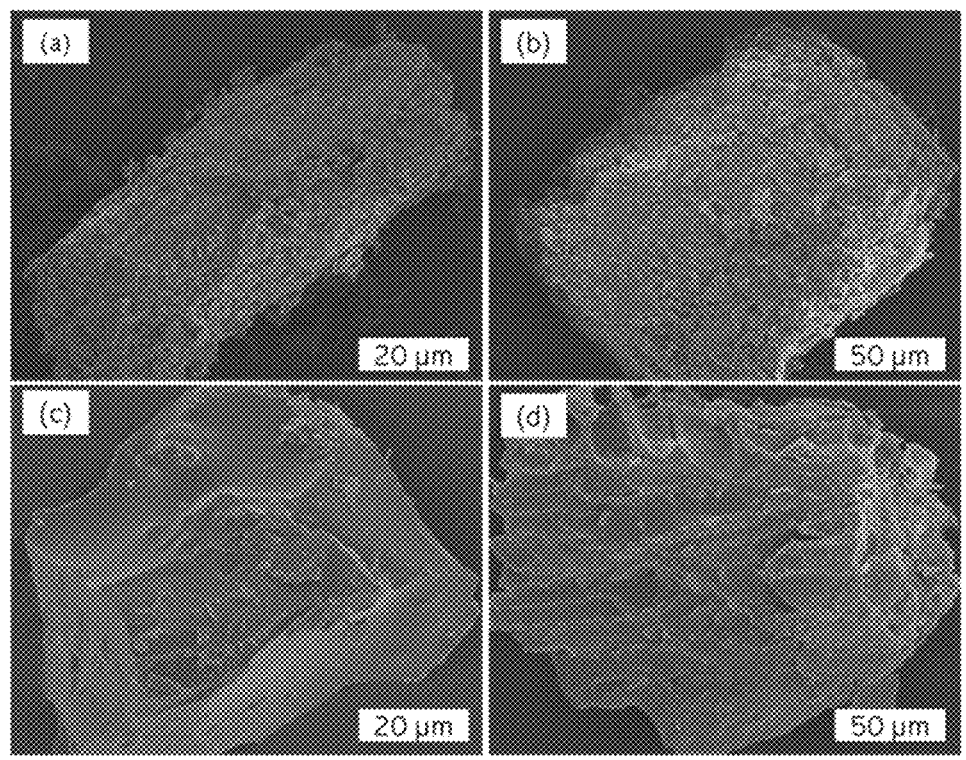
FIG. 2 (a) shows a Scanning Electron Microscopy (SEM) Image of Raw Ghaf Waste at 20 μm.

Referring now to FIG. 2. FIG. 2 shows SEM images of raw Ghaf waste 12 2(*a*) and 2(*b*) and extracted lignin 2(*c*) and 2(*d*) at two different magnifications. In the raw Ghaf waste 12, the surface is rough, fibrous, and porous, indicating the presence of tightly bound cellulose, hemicellulose, and lignin. Loose fiber aggregates, surface debris, and structural irregularities reflect the complex and heterogeneous nature of the biomass. In contrast, the extracted lignin exhibits a smoother, more homogeneous surface with negligible fibers or pores, confirming the removal of non-lignin polysaccharides. The absence of the fibrous network and reduced porosity validate the successful extraction of lignin 11. Some layering or fractures observed in the extracted lignin 11 reflect its brittle nature. These morphological changes confirm that the 100% organic NADES 14 pretreatment method was highly effective in extracting and purifying lignin 11 from Ghaf waste 12.

Energy Dispersive X-Ray (EDX) Analysis

Figures 3A, 3B:
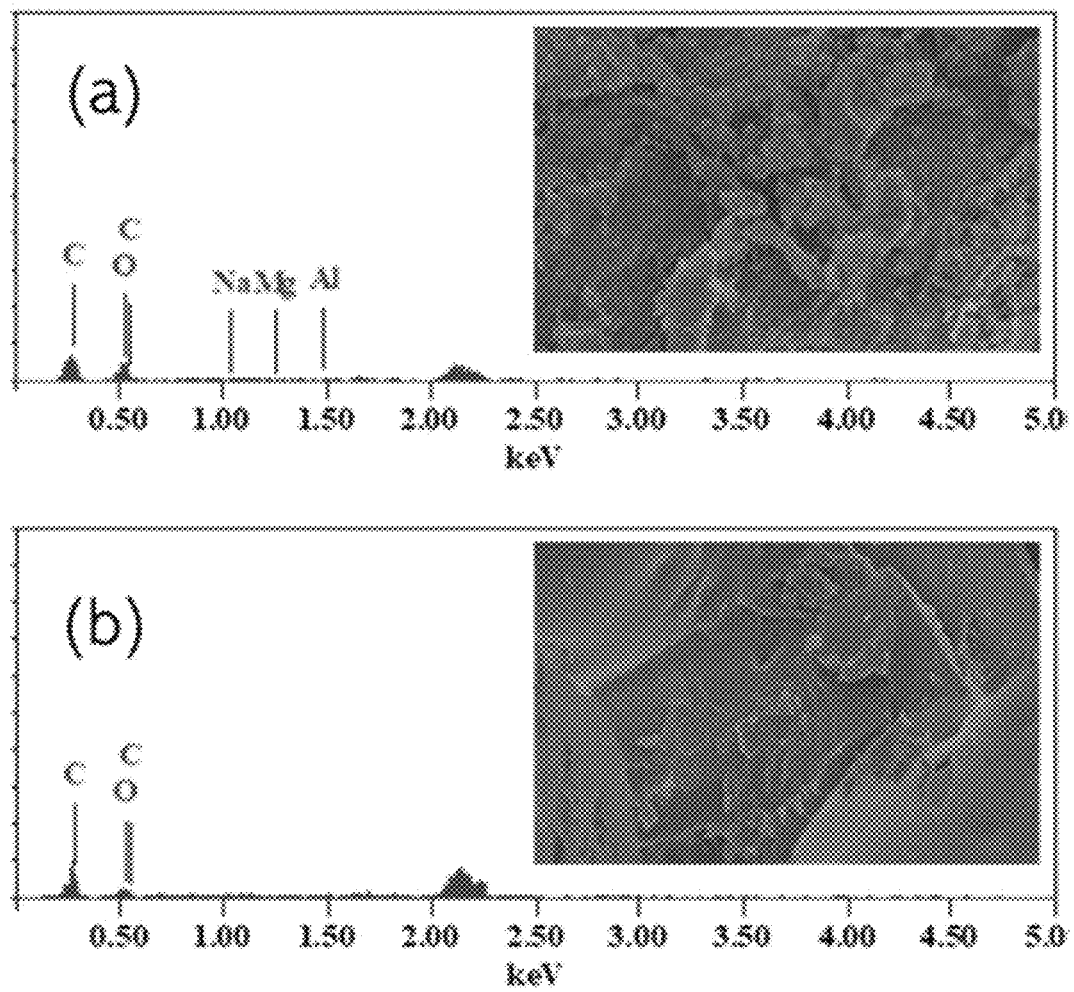
FIG. 3 (a) shows the Energy Dispersive X-ray (EDX) analysis of raw Ghaf waste.

Referring to FIG. 3. FIG. 3 shows the EDX analysis of 3(*a*) raw Ghaf waste 12 and 3(*b*) extracted lignin 11, highlighting the changes in elemental composition.

Referring to FIG. 8. FIG. 8 shows Table 2 which provides a detailed summary of their elemental composition. Peaks corresponding to carbon (C) are observed at 0.3 keV and 0.4 keV, while oxygen (O) peaks appear at 0.5 keV. In the raw Ghaf waste 12, the carbon content is 61.13 mass %, which increases to 70.27 mass % in the extracted lignin 11-representing an approximate 14.95% increase. This increase confirms the removal of non-carbonaceous components, such as cellulose and hemicellulose, leaving behind lignin 11, a carbon-rich polymer. Similarly, the oxygen content decreases from 38.28 mass % in the raw Ghaf waste 12 to 29.74 mass % in the extracted lignin 11, indicating an approximate 22.31% reduction. This reduction results from the elimination of oxygen-rich polysaccharides (cellulose and hemicellulose) and hydroxyl groups, thereby increasing the carbon-to-oxygen ratio in the lignin. The EDX spectrum of the raw Ghaf waste 12 also shows peaks for Na (1.0 keV), Mg (1.3 keV), and Al (1.5 keV), indicating the presence of inorganic minerals, which are native to raw biomass. These peaks are absent in the extracted lignin 11, confirming the removal of mineral impurities during the extraction process. EDX analysis showed that the 100% organic NADES 14 used for extraction efficiently removes non-lignin components and inorganic impurities, resulting in high-purity lignin 11 with high carbon content.

X-Ray Diffraction (XRD) Analysis

Figure 4:
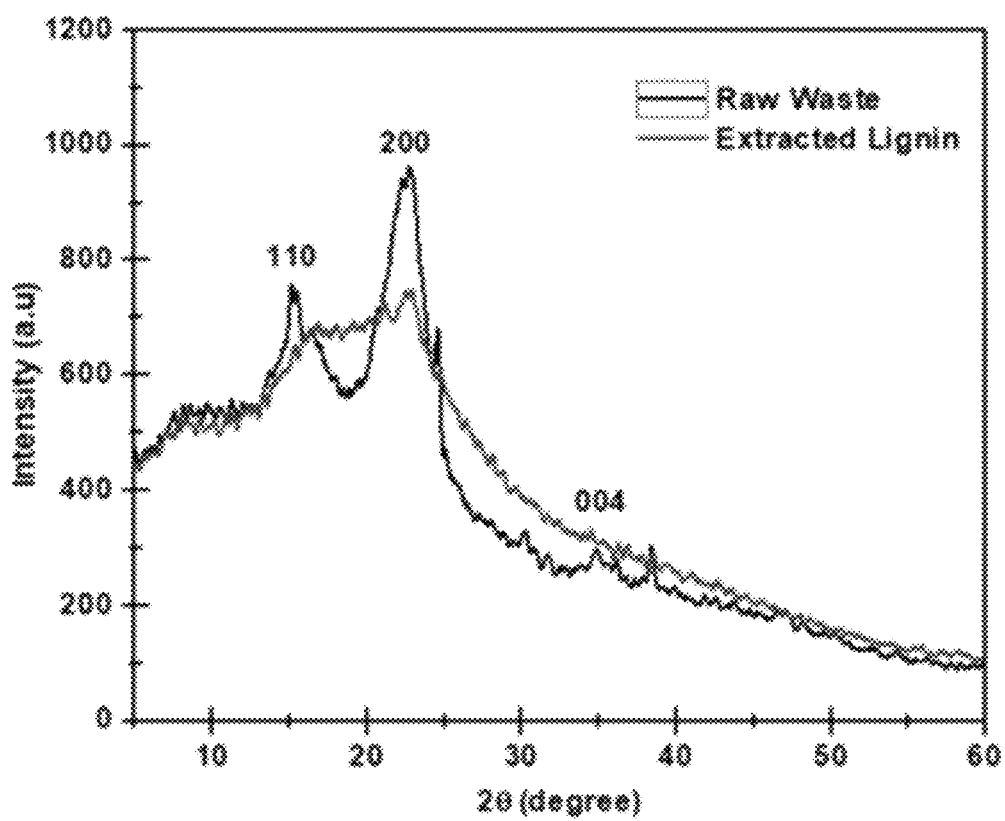
FIG. 4 shows a graph showing XRD diffractograms of Raw Ghaf Waste and Extracted Lignin using NADES, in accordance with the invention.

Referring to FIG. 4, FIG. 4 presents the XRD diffractograms of raw Ghaf waste 12 and the lignin 11 extracted using NADES 14. The diffractogram of the raw Ghaf waste 12 exhibits distinct peaks at 2θ=15.35°, 22.60°, and 34.50°, which correspond to the crystallographic planes of cellulose IB, the prevalent polymorph in higher plants. These peaks are characteristic of lignocellulosic biomass and indicate the presence of crystalline cellulose structures. Additionally, a peak at 2θ=24.69° suggests a secondary reflection associated with cellulose IB, potentially signifying subtle crystalline rearrangements. This secondary peak may also be indicative of lignin-carbohydrate complexes (LCCs), where lignin forms ordered aggregates with polysaccharides, contributing to the overall crystalline structure of the biomass. The crystallinity degree of the fibers can be assessed by analyzing the sharpness of the diffraction peaks, with sharper peaks indicating a higher crystallinity. In the XRD spectra of the extracted lignin 11, an obvious reduction in peak intensity is observed, signifying the effective removal of polysaccharides.

Referring to FIG. 9, Table 3 provides XRD data for raw Ghaf waste 12 and extracted lignin 11, showing the intensities of the amorphous (lam) and crystalline (1200) regions, along with the corresponding crystallinity index (Cr). For raw waste, a Crof 41.46% highlights a significant presence of crystalline cellulose. After extraction, the Cr of the lignin drops to 10.56%, indicating a marked reduction in crystalline content. This sharp decline reflects the effective removal of polysaccharides, primarily cellulose and hemicellulose, which are responsible for the crystalline regions in lignocellulosic materials. The significant reduction in crystallinity confirms that the 100% organic solvent successfully extracted lignin 11 by efficiently removing these polysaccharides.

Thermogravimetric Analysis (TGA)

Figure 5:
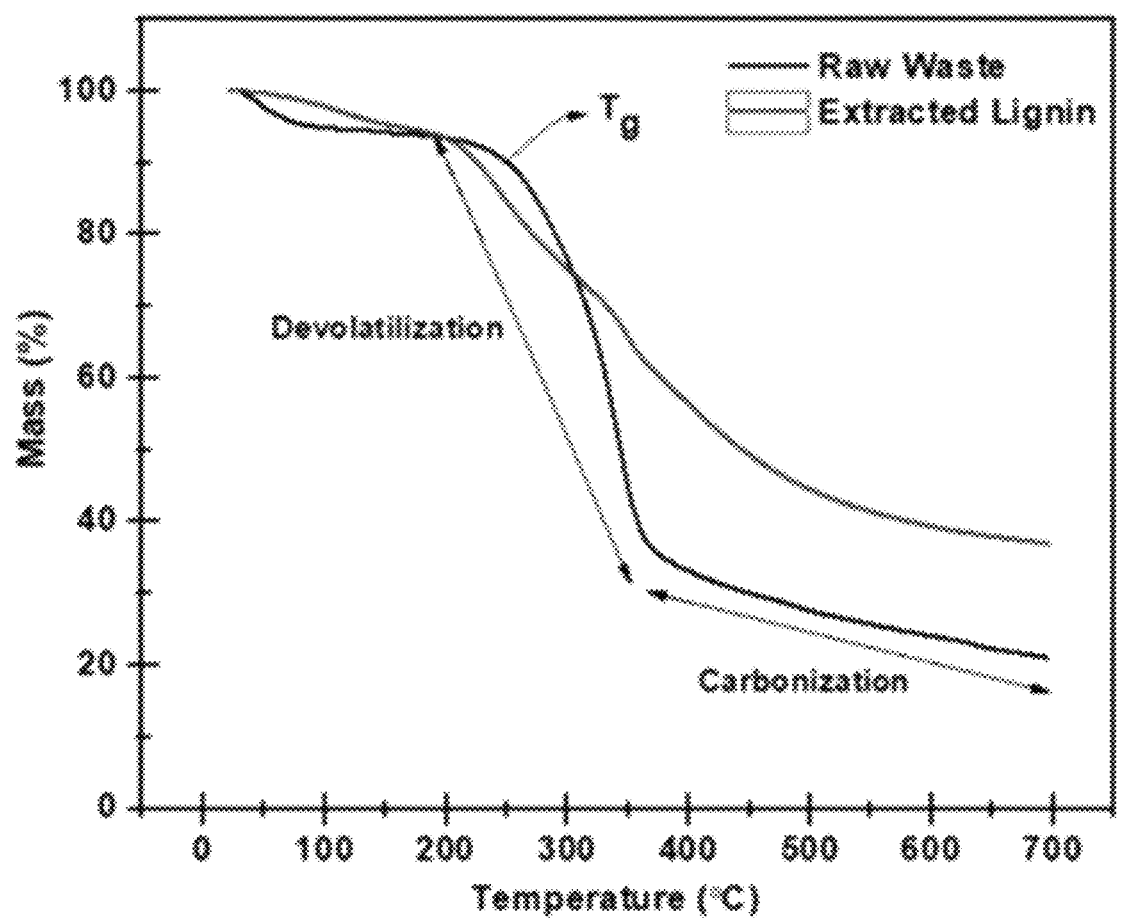
FIG. 5 shows Thermogravimetric analysis (TGA) profiles of Raw Ghaf Waste and Extracted Lignin, extracted in accordance with the method of the invention.

FIG. 5 shows the TGA profiles of raw Ghaf waste 12 and extracted lignin 11. The curves exhibit typical characteristics of lignocellulosic materials, with the decomposition process divided into three regions: dehydration, devolatilization (or main decomposition), and carbonization. In lignocellulosic materials, the dehydration phase involves the release of moisture and light hydrocarbons. The main decomposition phase, also referred to as the active pyrolysis region, corresponds to the breakdown of cellulose and hemicellulose into vapor-phase products, which can later condense to form bio-oil. The carbonization phase involves the thermal degradation of lignin, resulting in the formation of a carbon-rich solid residue known as biochar. The main decomposition region is particularly important for assessing the number of polysaccharides (cellulose and hemicellulose) present in the material. Hemicellulose typically decomposes between 180-300° C., cellulose between 300-400° C., and lignin over a broader range of 300-500° C. due to its complex aromatic structure. Table 4 shows the thermal decomposition characteristics of raw Ghaf waste 12 and extracted lignin 11. In the raw Ghaf waste 12, the onset temperature ($T_{onset}$) is observed at 238° C. with an initial 8.72% mass loss. The devolatilization range (238-364° C.), which mainly corresponds with the decomposition of cellulose and hemicellulose, exhibited a 54.06% mass loss, reflecting the significant presence of these polysaccharides. In contrast, the extracted lignin 11 begins to decompose earlier, with a $T_{onset}$ of 202° C. due to the removal of cellulose, which is a highly stable biopolymer, and with an initial 7.01% mass loss, while the devolatilization range (202-362° C.) shows only 30.77% mass loss. The mass loss in the devolatilization region is reduced by 43.08% in the extracted lignin 11 compared to the raw Ghaf waste 12. This is due to the absence of cellulose and hemicellulose in the extracted lignin 11. The higher char residue (36.92%) at 700° C. in the extracted lignin 11 compared to 20.85% for raw Ghaf waste 12 indicates the presence of more carbon-rich material, primarily lignin 11, which is more thermally stable. The reduced mass loss in the devolatilization region, combined with the increased char yield, shows the enriched aromatic nature of the extracted lignin 11.

Figure 6:
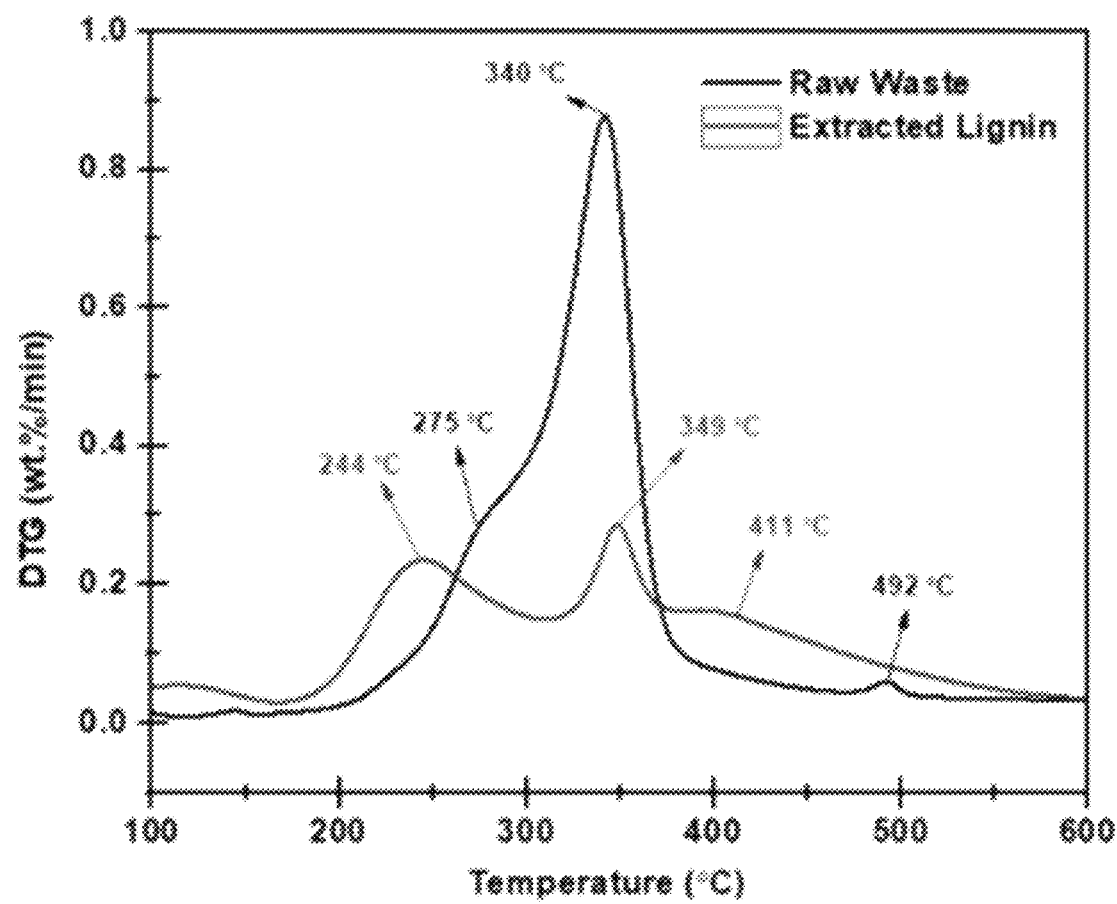
FIG. 6 shows the differential thermogravimetric (DTG) curves for raw Ghaf waste and extracted lignin extracted in accordance with the method of the invention.

FIG. 6 shows the differential thermogravimetric (DTG) curves for raw Ghaf waste 12 and extracted lignin 11. In the raw Ghaf waste 12, peaks at 275° C., 340° C., and 492° C. correspond to the degradation of hemicellulose, cellulose, and lignin 11, respectively. Hemicellulose decomposes first due to its lower thermal stability, followed by a sharp cellulose peak at 340° C., indicating the primary breakdown of its crystalline regions. Lignin in the raw biomass degrades gradually, with a broader peak at 492° C., reflecting its complex structure and resistance to thermal degradation. For the extracted lignin 11, peaks are observed at 244° C., 349° C., and 411° C. The 244° C. peak suggests the breakdown of low-molecular-weight compounds or residual impurities. The prominent 349° C. and 411° C. peaks correspond to the primary and secondary decomposition of lignin 11, involving cleavage of ether bonds and degradation of aromatic units. Additionally, the decomposition behavior of the extracted lignin 11 is comparable to that of commercial lignin, as reported by A. Merajet et al, who observed DTG peaks at 245° C., 418° C., and 590° C. See A. Merajet et al., "Isolation and characterisation of lignin using natural deep eutectic solvents pretreated kenaf fibre biomass," Scientific Reports, vol. 14, no. 1, p. 8672, 2024. This similarity verifies that the extracted lignin 11 from Ghaf waste 12 follows a typical lignin decomposition pattern, confirming the effectiveness of the extraction process. Furthermore, the absence of the 275° C. and 340° C. peaks in the lignin curve confirms the successful removal of hemicellulose and cellulose. Both TGA and DTG analysis showed that the 100% organic NADES 14 extraction effectively extracted the lignin 11 from lignocellulosic waste with good purity.

Advantages of the Invention

The inventors believe that this is the first reported study to use a 100% organic fruit-based NADES 14 for lignin extraction, combined with an acid-free protocol to obtain lignin, making the entire process environmentally safe. A non-precipitation method was used, employing a two-stage process with freeze-drying and subsequent heating in a convection oven 20. By adhering to green chemistry principles, the inventors believe that this method 10 supports the United Nations Sustainable Development Goals (SDGs), particularly SDG 12 (Responsible Consumption and Production) and SDG 13 (Climate Action), by promoting eco-friendly methods in biomass utilization.

The inventors further believe that the method 10 and results demonstrate the first-ever successful extraction of lignin 11 from lignocellulosic biomass using a 100% organic fruit-based solvent, marking a novel advancement in sustainable biomass utilization. Unlike conventional methods that rely on synthetic chemicals or acids, this innovative process employs a fully natural deep eutectic solvent composed of citric acid and fructose, ensuring a completely biodegradable and eco-friendly approach. Additionally, the method 10 uniquely integrates a non-acid precipitation technique with lyophilization (freeze-drying) and successive drying steps to isolate and purify lignin, yielding a dry and dispersible final product free from chemical residues. This pioneering approach has the potential to revolutionize the lignin production industry by providing an entirely organic, safe, and sustainable alternative to traditional extraction methods, aligning perfectly with the global push towards greener technologies and circular economy practices.

Further advantages of the invention include the invention:

Eliminates the use of synthetic chemicals and acids, significantly reducing environmental impact and promoting sustainability.

Utilizes inexpensive and readily available fruit-based components, lowering production costs compared to traditional methods.

Ensures safer handling for operators and minimizes health and safety risks.

Produces dry, dispersible lignin 11 free from chemical residues, making it suitable for high-value applications.

Operates at moderate temperatures with optimized drying techniques, reducing energy consumption.

Can be adapted to various types of lignocellulosic biomass, maximizing the utilization of agricultural and forestry waste.

Converts waste biomass into a valuable product, promoting resource efficiency and waste reduction.

Provides an innovative, organic alternative for lignin 11 production, setting a new standard in the industry and supporting the transition to greener technologies.

Unlike traditional solvents (e.g., NaOH, KOH, or chlorinated solutions), this method 10 uses fully organic, biodegradable, and renewable materials, making it environmentally superior.

Avoids the need for acid precipitation, simplifying the process and eliminating the risk of chemical waste or environmental contamination.

The process uses low-cost, readily available materials and does not require expensive or complex equipment, making it suitable for large-scale industrial applications.

Produces a high-quality lignin product that is dispersible and free from chemical contaminants, making it more versatile for industrial and research applications.

Operates at moderate temperatures (60° C.) and uses optimized drying protocols, reducing energy consumption compared to traditional high-temperature processes.

The method 10 is applicable to a range of lignocellulosic biomass types, including Ghaf waste 12 and other agricultural residues.

Aligns with global efforts to adopt greener technologies, reduce waste, and support the circular economy.

The environmentally friendly and cost-effective nature of the process creates opportunities for establishing new industries focused on organic lignin extraction, especially in regions with abundant biomass resources.

The exact configuration of the method 10 of extracting lignin 11 from a lignocellulosic biomass 12, in accordance with the invention, may vary greatly while still incorporating the essential features of the invention as described hereinabove.

The invention claimed is:

1. A method of extracting the lignin from a lignocellulosic biomass, the method comprising:
    providing a lignocellulosic biomass;
    providing a natural deep eutectic solvent (NADES) formed from Citric Acid (CA) and Fructose (Fr);
    mixing the lignocellulosic biomass with the natural deep eutectic solvent;
    obtaining a lignin-NADES suspension;
    lyophilizing the lignin-NADES suspension;
    rehydrating the lignin-NADES suspension;
    drying the rehydrated lignin-NADES suspension;
    repeating the steps of rehydrating the lignin-NADES suspension and drying the rehydrated lignin-NADES suspension;
    thereby obtaining lignin particles.

2. The method as claimed in claim 1, wherein the NADES provided is non-choline based.

3. The method as claimed in claim 1, wherein the NADES provided is organic and fruit based.

4. The method as claimed in claim 1, wherein the lignocellulosic biomass is Ghaf biomass.

5. The method as claimed in claim 1, wherein the lignocellulosic biomass is Ghaf biomass waste.

6. The method as claimed in claim 1, wherein the step of providing a natural deep eutectic solvent (NADES) formed from Citric Acid (CA) and Fructose (Fr) comprises adding distilled water (DI) to the mixture to reduce viscosity, allowing DI to become part of the NADES superstructure.

7. The method as claimed in claim 1, wherein the step of providing a natural deep eutectic solvent (NADES) formed from Citric Acid (CA) and Fructose (Fr) comprises mixing CA and Fr with distilled water (DI) in a fixed molar ratio to form the NADES, wherein the fixed molar ratio of CA to Fr to distilled water is selected from the group consisting of: 1:1:1, 3:1:1, and 5:1:1.

8. The method as claimed in claim 1, wherein the step of providing a natural deep eutectic solvent (NADES) formed from Citric Acid (CA) and Fructose (Fr) includes adjusting a pH to about pH 1.4.

9. The method as claimed in claim 1, wherein the step of providing a natural deep eutectic solvent (NADES) formed from Citric Acid (CA) and Fructose (Fr) comprises stirring the mixture at about 600 rpm for about 10 minutes.

10. The method as claimed in claim 1, wherein the step of providing a natural deep eutectic solvent (NADES) formed from Citric Acid (CA) and Fructose (Fr) includes heating the mixture to approximately 100° C. to evaporate the DI.

11. The method as claimed in claim 1, wherein the step of mixing the lignocellulosic biomass with the natural deep eutectic solvent comprises treating a Ghaf biomass waste with NADES at a biomass-to-solvent ratio (w/v) of 1:10.

12. The method as claimed in claim 11, wherein the step of mixing further comprises stirring the mixture at about 500 rpm while heating the mixture at about 60° C. for about 3 hours.

13. The method as claimed in claim 12, further comprising a step of terminating a reaction of the mixture comprising adding about 20 mL of cold water at about 4° C.

14. The method as claimed in claim 1, wherein the step of obtaining a lignin-NADES suspension comprises vacuum filtering the mixture to obtain the lignin-NADES suspension as filtrate.

15. The method as claimed in claim 1, wherein the step of lyophilizing the lignin-NADES suspension comprises vacuum freeze-drying the lignin-NADES suspension at about −85° C. for about 24 hours.

16. The method as claimed in claim 1, wherein the step of rehydrating the lignin-NADES suspension comprises mixing the lyophilized product with about 20 mL of fresh deionized water (DI).

17. The method as claimed in claim 1, wherein the step of drying the rehydrated lignin-NADES suspension comprises drying in an air-circulating oven at about 105° C. for about 24 hours.

18. The method as claimed in claim 17, wherein the drying step further comprises stirring with about 20 mL of DI for about 5 minutes and repeating the drying process three times until fully dry, dispersible lignin particles are obtained.

19. The method as claimed in claim 1, wherein the method is achieved without the use of acid-precipitation methods.

* * * * *